(12) United States Patent
Zhang (10) Patent No.: US 11,379,723 B2
(45) Date of Patent: Jul. 5, 2022

(54) METHOD AND APPARATUS FOR COMPRESSING NEURAL NETWORK

(71) Applicant: Baidu Online Network Technology (Beijing) Co., Ltd., Beijing (CN)

(72) Inventor: Gang Zhang, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 952 days.

(21) Appl. No.: 16/143,719

(22) Filed: Sep. 27, 2018

(65) Prior Publication Data

US 2019/0205759 A1 Jul. 4, 2019

(30) Foreign Application Priority Data

Dec. 29, 2017 (CN) .......................... 201711473963.3

(51) Int. Cl.
*G06N 3/08* (2006.01)
*G06N 3/10* (2006.01)
(Continued)

(52) U.S. Cl.
CPC ........... *G06N 3/082* (2013.01); *G06N 3/0481* (2013.01); *G06N 3/10* (2013.01); *G06N 20/00* (2019.01)

(58) Field of Classification Search
CPC ...... G06N 3/082; G06N 20/00; G06N 3/0481; G06N 3/10
See application file for complete search history.

(56) References Cited

U.S. PATENT DOCUMENTS

2010/0106458 A1    4/2010 Leu

FOREIGN PATENT DOCUMENTS

CN    104778496 A    7/2015
CN    106485316 A    3/2017
(Continued)

OTHER PUBLICATIONS

Luo, Jian-Hao, and Jianxin Wu. "An entropy-based pruning method for cnn compression." arXiv preprint arXiv:1706.05791 (2017). (Year: 2017).*

(Continued)

*Primary Examiner* — Eric Nilsson
(74) *Attorney, Agent, or Firm* — Nixon Peabody LLP (57) ABSTRACT

A method and apparatus for compressing a neural network are provided. A specific embodiment of the method includes: acquiring a to-be-compressed trained neural network; selecting at least one layer from layers of the neural network as a to-be-compressed layer; performing following processing steps sequentially on each of the to-be-compressed layers in descending order of the number of level of the to-be-compressed layer: determining a pruning ratio based on a total number of parameters included in the to-be-compressed layer, selecting a parameter for pruning from the parameters included in the to-be-compressed layer based on the pruning ratio and a parameter value threshold, and training the pruned neural network based on a preset training sample using a machine learning method; and determining the neural network obtained after performing the processing steps on the selected at least one to-be-compressed layer as a compressed neural network, and storing the compressed neural network.

11 Claims, 5 Drawing Sheets

(51) Int. Cl.
  *G06N 3/04* (2006.01)
  *G06N 20/00* (2019.01)

(56) References Cited

FOREIGN PATENT DOCUMENTS

| CN | 106612437 A | 5/2017 |
|---|---|---|
| CN | 106650928 A | 5/2017 |
| CN | 106779068 A | 5/2017 |
| CN | 106779075 A | 5/2017 |
| CN | 107239825 A | 10/2017 |

OTHER PUBLICATIONS

Tung, Frederick, Srikanth Muralidharan, and Greg Mori. "Fine-pruning: Joint fine-tuning and compression of a convolutional network with Bayesian optimization." arXiv preprint arXiv:1707.09102 (2017). (Year: 2017).*

Li, Hao, et al. "Pruning filters for efficient convnets." arXiv preprint arXiv:1608.08710 (2016). (Year: 2016).*

Sriraam, N.; "Quality-on-Demand Compression of EEG Signals for Telemedicine Applications Using Neural Network Predictors"; Hindawi Publishing Company, Int'l Journal of Telemedicine and Applications, vol. 2011, Article ID No. 860549, May 9, 2011; doi: 10.1155/2011/860549 (13 pages).

Wang Lee et al.; "A survey on model compression of deep neural network for embedded system"; Journal of Beijing Jiaotong University, vol. 41; No. 6; Dec. 2017; in Chinese with English translation of Abstract only; doi: 10.11860/j.issn.1673-0291.2017.06.006 (8 pages).

* cited by examiner

METHOD AND APPARATUS FOR COMPRESSING NEURAL NETWORK

CROSS-REFERENCE TO RELATED APPLICATIONS

This application claims priority to Chinese Patent Application no. 201711473963.3, filed with the China National Intellectual Property Administration (CNIPA) on Dec. 29, 2017, the contents of which are incorporated herein by reference in their entirety.

TECHNICAL FIELD

Embodiments of the present disclosure relate to the field of computer technology, specifically to the field of Internet technology, and more specifically to a method and apparatus for compressing a neural network.

BACKGROUND

Recently, with the continuous development of artificial intelligence, the application range of neural networks is also constantly expanding. Here, the neural network is an abbreviation of artificial neural network. The neural network may be applied to a server to process images, texts, audios, and the like. Certainly, now the neural network may also be included in a client application. A user may edit images, texts, audios, etc. through the neural network in the client application installed on the terminal device.

Existing neural networks usually take up a lot of storage space, such as disk space or memory space. If the users install a lot of applications including neural networks on their device (e.g., a mobile device such as a smartphone or a tablet), the device may have less available storage space, and abnormal conditions such as slow running and downtime may occur on the device.

SUMMARY

Embodiments of the present disclosure propose a method and apparatus for compressing a neural network.

In a first aspect, the embodiments of the present disclosure provide a method for compressing a neural network, including: acquiring a to-be-compressed trained neural network; selecting at least one layer from layers of the neural network as a to-be-compressed layer; performing the following processing steps sequentially on each of the to-be-compressed layers in descending order of the number of level of the to-be-compressed layer in the neural network: determining a pruning ratio based on a total number of parameters included in the to-be-compressed layer, selecting a parameter for pruning from the parameters included in the to-be-compressed layer based on the pruning ratio and a parameter value threshold, and training the pruned neural network based on a preset training sample using a machine learning method; and determining the neural network obtained after performing the processing steps on the selected at least one to-be-compressed layer as a compressed neural network, and storing the compressed neural network.

In some embodiments, the selecting at least one layer from layers of the neural network as a to-be-compressed layer includes: selecting, in response to the neural network including a convolutional layer and a fully connected layers, at least one of at least one convolutional layer or at least one fully connected layers as the to-be-compressed layer.

In some embodiments, the selecting a parameter for pruning from the parameters included in the to-be-compressed layer based on the pruning ratio and a parameter value threshold, and training the pruned neural network based on a preset training sample using a machine learning method includes: performing the following pruning training operations: determining a product of a specified ratio and the total number as a pruning number, and selecting, from the parameters included in the to-be-compressed layer, the pruning number of parameters having an absolute value of a parameter value not greater than the parameter value threshold for pruning in ascending order of the absolute value of the parameter value, wherein the specified ratio is not greater than the pruning ratio; training the pruned neural network based on the training sample using the machine learning method; and stopping execution of the pruning training operations in response to determining that an accuracy of the current trained neural network is lower than a preset accuracy, or a ratio of the number of the pruned parameters to the total number in the to-be-compressed layer is not lower than the pruning ratio; and resetting the specified ratio based on the pruning ratio and the ratio, and continuing the pruning training operations in response to determining that the accuracy of the current trained neural network is not lower than the preset accuracy and the ratio is lower than the pruning ratio.

In some embodiments, the resetting the specified ratio based on the pruning ratio and the ratio includes: subtracting the ratio from the pruning ratio to obtain a first ratio, and resetting the specified ratio to a positive number not greater than the first ratio.

In some embodiments, the resetting the specified ratio to a positive number not greater than the first ratio includes: resetting the specified ratio to a positive number not greater than the first ratio and a current value of the specified ratio.

In some embodiments, the resetting the specified ratio to a positive number not greater than the first ratio and a current value of the specified ratio includes: resetting the specified ratio to a positive number less than the current value and not greater than the first ratio.

In a second aspect, the embodiments of the present disclosure provide an apparatus for compressing a neural network, including: an acquisition unit, configured to acquire a to-be-compressed trained neural network; a selection unit, configured to select at least one layer from layers of the neural network as a to-be-compressed layer; a processing unit, configured to perform following processing steps sequentially on each of the to-be-compressed layers in descending order of the number of level of the to-be-compressed layer in the neural network: determining a pruning ratio based on a total number of parameters included in the to-be-compressed layer, selecting a parameter for pruning from the parameters included in the to-be-compressed layer based on the pruning ratio and a parameter value threshold, and training the pruned neural network based on a preset training sample using a machine learning method; and a storing unit, configured to determine the neural network obtained after performing the processing steps on the selected at least one to-be-compressed layer as a compressed neural network, and store the compressed neural network.

In some embodiments, the selection unit includes: a selection subunit, configured to select, in response to the neural network including a convolutional layer and a fully connected layers, at least one of at least one convolutional layer or at least one fully connected layers as the to-be-compressed layer.

In some embodiments, the processing unit includes: a first processing subunit, configured to perform the following pruning training operations: determining a product of a specified ratio and the total number as a pruning number, and selecting, from the parameters included in the to-be-compressed layer, the pruning number of parameters having an absolute value of a parameter value not greater than the parameter value threshold for pruning in ascending order of the absolute value of the parameter value, wherein the specified ratio is not greater than the pruning ratio; training the pruned neural network based on the training sample using the machine learning method; and stopping execution of the pruning training operations in response to determining that an accuracy of the current trained neural network is lower than a preset accuracy, or a ratio of the number of the pruned parameters to the total number in the to-be-compressed layer is not lower than the pruning ratio; and a second processing subunit, configured to reset the specified ratio based on the pruning ratio and the ratio, and continue the pruning training operations in response to determining that the accuracy of the current trained neural network is not lower than the preset accuracy and the ratio is lower than the pruning ratio.

In some embodiments, the second processing subunit includes: a setting module, configured to subtract the ratio from the pruning ratio to obtain a first ratio, and reset the specified ratio to a positive number not greater than the first ratio.

In some embodiments, the setting module includes: a setting submodule, configured to reset the specified ratio to a positive number not greater than the first ratio and a current value of the specified ratio.

In some embodiments, the setting submodule is further configured to: reset the specified ratio to a positive number less than the current value and not greater than the first ratio.

In a third aspect, the embodiments of the present disclosure provide an electronic device, including: one or more processors; and a storage apparatus, for storing one or more programs, the one or more programs, when executed by the one or more processors, cause the one or more processors to implement the method according to any one of the embodiments in the first aspect.

In a fourth aspect, the embodiments of the present disclosure provide a non-transitory computer readable storage medium, storing a computer program thereon, the program, when executed by a processor, implements the method according to any one of the embodiments in the first aspect.

The method and apparatus for compressing a neural network provided by the embodiments of the present disclosure select at least one layer from layers of the acquired to-be-compressed trained neural network as a to-be-compressed layer, perform specified processing steps sequentially on each of the to-be-compressed layers in descending order of the number of level of the to-be-compressed layer in the neural network to determine the neural network obtained after performing the processing steps on the selected at least one to-be-compressed layer as a compressed neural network and store the compressed neural network. Therefore, the specified processing steps performed on the selected to-be-compressed layer are effectively utilized to appropriately prune the parameters in the to-be-compressed layer, and the pruned neural network based on a preset training sample is trained using the machine learning method, so that the neural network may be restored to the original accuracy as much as possible, thereby achieving effective compression of the neural network.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present application will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
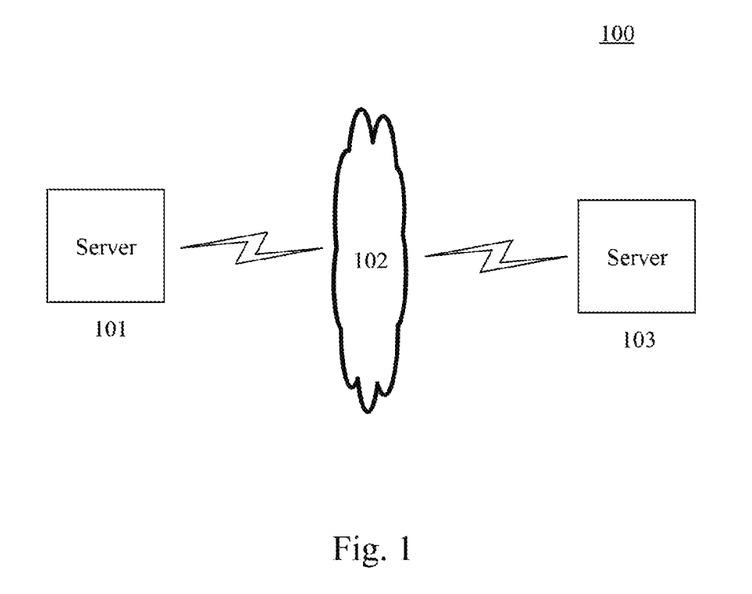
FIG. 1 is an exemplary system architecture diagram to which the present disclosure may be applied.

FIG. 1 shows an illustrative architecture of a system 100 which may be used by a method for compressing a neural network or an apparatus for compressing a neural network according to the embodiments of the present application.

As shown in FIG. 1, the system architecture 100 may include servers 101 and 103, and a network 102. The network 102 serves as a medium providing a communication link between the servers 101 and 103. The network 102 may include various types of connections, such as wired or wireless transmission links, or optical fibers.

The server 101 may be a server providing various services, for example, a data storage server for storing the trained neural network.

The server 103 may be a server providing various services, for example, a server for compressing a neural network. The server may acquire a to-be-compressed trained neural network, analyze the neural network, and store a processing result (for example, a compressed neural network).

It should be noted that the method for compressing a neural network according to the embodiments of the present application is generally executed by the server 103. Accordingly, the apparatus for compressing a neural network is generally installed on the server 103.

It should be noted that if the neural network acquired by the server 103 is prestored locally, the system architecture 100 may do not include the server 101.

It should be appreciated that the numbers of the servers and the networks in FIG. 1 are merely illustrative. Any number of servers and the networks may be provided based on the actual requirements.

Figure 2:
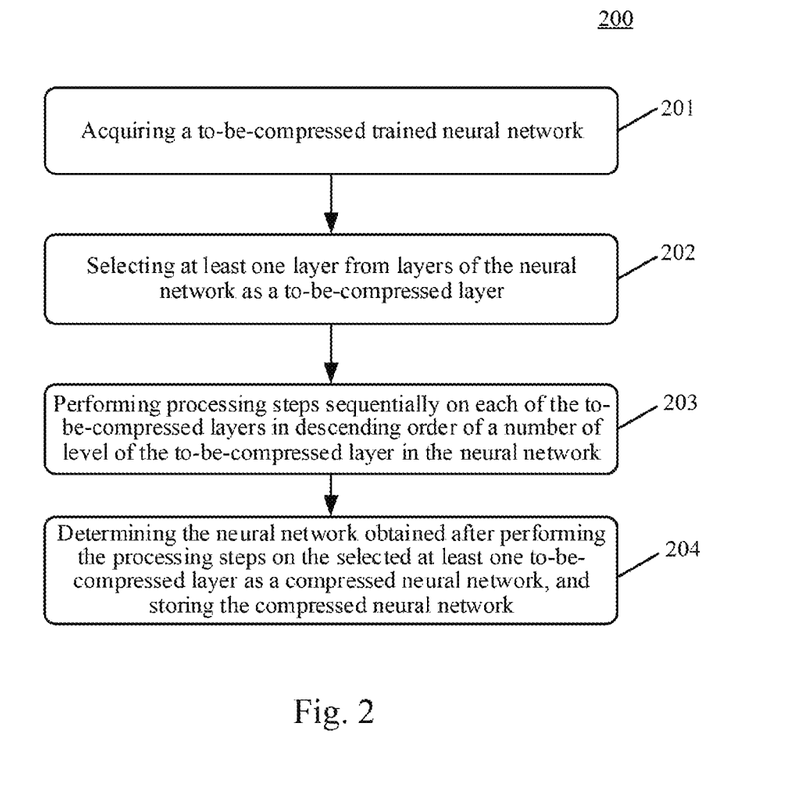
FIG. 2 is a flowchart of an embodiment of a method for compressing a neural network according to the present disclosure.

With further reference to FIG. 2, a flow 200 of an embodiment of the method for compressing a neural network according to the present disclosure is illustrated. The flow 200 of the method for compressing a neural network includes the following steps:

Step 201, acquiring a to-be-compressed trained neural network.

In the present embodiment, the electronic device (e.g., the server 103 as shown in FIG. 1) on which the method for compressing a neural network operate may acquire a to-be-compressed trained neural network from a server in remote communication connection (e.g., the server 101 as shown in FIG. 1) through a wired connection or a wireless connection. Certainly, if the neural network is pre-stored locally in the electronic device, the electronic device may also acquire the neural network locally.

It should be noted that the above neural network may be a neural network occupying space exceeding an occupancy threshold. Further, the neural network may be a neural network that occupies space exceeding the occupancy threshold and is included in a client application, such as a client application suitable for mobile devices. When the neural network in the client application occupies large storage space, by compressing the neural network, the disk space or memory space of the terminal device on which the client application is installed may be saved. Moreover, when the user downloads the client application, the user's waiting time may be reduced, and the consumption of traffic may be reduced.

In addition, the neural network acquired by the electronic device may include, for example, at least one input layer, at least one hidden layer, and at least one output layer. Here, each layer of the neural network may have a corresponding number of level. For example, assuming that the neural network includes one input layer, one hidden layer, and one output layer, the input layer may be in the first layer of the neural network, and the number of level of the input layer may be 1; the hidden layer may be in the second layer of the neural network, and the number of level of the hidden layer may be 2; and the output layer may be in the third layer of the neural network, and the number of level of the output layer may be 3.

It should be noted that the neural network may refer to the artificial neural network (ANN). A neural network is usually an operational model consisting of a large number of nodes (or neurons) connected to each other. Each node may represent a specific output function, which is referred to as an activation function. The connection between every two nodes represents a weighted value for passing the connection signal, which is referred to as a weight and is deemed as the memory of the artificial neural network. Common neural networks include, for example, deep neural network (CNN), convolutional neural network (CNN), and recurrent neural network (RNN).

Step 202, selecting at least one layer from layers of the neural network as a to-be-compressed layer.

In the present embodiment, the electronic device may select at least one layer from layers of the neural network as a to-be-compressed layer. For example, the electronic device may select each layer of the neural network as the to-be-compressed layer.

In some alternative implementations of the present embodiment, in response to the neural network including a convolutional layer and a fully connected layers (PC), the electronic device may select at least one convolutional layer and at least one fully connected layers as the to-be-compressed layers.

Step 203, performing processing steps sequentially on each of the to-be-compressed layers in descending order of the number of level of the to-be-compressed layer in the neural network.

In the present embodiment, after selecting the to-be-compressed layer from the acquired neural network, the electronic device may perform the following processing steps sequentially on each of the to-be-compressed layers in descending order of the number of level of the to-be-compressed layer in the neural network: determining a pruning ratio based on the total number of parameters (weights) included in the to-be-compressed layer, selecting a parameter for pruning from the parameters included in the to-be-compressed layer based on the pruning ratio and a parameter value threshold (e.g., 0.1), and training the pruned neural network based on a preset training sample using a machine learning method. It should be noted that the parameter value threshold may be adjusted according to actual needs, and the present, embodiment does not have any limitations with this respect. In addition, the electronic device may implement pruning of the parameter by setting the selected parameter to a specified value (e.g., 0).

For example, the electronic device may be pre-stored with a set of value ranges locally, where each of the value ranges may correspond to a pruning ratio. The electronic device may first find a value range in the set of value ranges in which the total number of parameters included in the to-be-compressed layer is located, and determine the pruning ratio corresponding to the value range as the pruning ratio corresponding to the to-be-compressed layer. Then, the electronic device may calculate the product of the pruning ratio and the total number, and determine the product as the pruning number. Then, the electronic device may select, from the parameters included in the to-be-compressed layer, the pruning number of parameters having an absolute value of a parameter value not greater than the parameter value threshold for pruning in ascending order of the absolute value of the parameter value, that is, setting the selected parameter to the specified value. Finally, the electronic device may train the pruned neural network based on a present training sample using the machine learning method, so that the accuracy of the current trained neural network is restored to the original accuracy as much as possible.

Here, when the electronic device is training the pruned neural network, at least one round of training operations may be performed. After each round of training operations, the trained neural network may be used to perform a prediction operation on a preset test sample to determine the accuracy of the neural network.

It should be noted that the electronic device may fine-tune the neural network when training the pruned neural network. The advantage of fine-tuning is that the training efficiency may be improved without completely retraining the neural network, and a better result may be obtained after a relatively small number of iterations. For example, with a reduced number of parameters of the neural network, the current accuracy is close to the original accuracy.

In some alternative implementations of the present embodiment, for each to-be-compressed layer, the electronic device may select a parameter for pruning from the parameters included in the to-be-compressed layer based on the pruning ratio and the parameter value threshold corresponding to the to-be-compressed layer, and train the pruned neural network based on the preset training sample using the machine learning method by the following method:

First, the electronic device may perform the following pruning training operations: determining the product of the specified ratio and the total number of original parameters included in the to-be-compressed layer as the pruning number, and selecting, from the parameters included in the to-be-compressed layer, the pruning number of parameters having an absolute value of a parameter value not greater than the parameter value threshold for pruning in ascending order of the absolute value of the parameter value, wherein the specified ratio is not greater than the pruning ratio; training the pruned neural network based on the training sample using the machine learning method; and stopping execution of the pruning training operations in response to determining that the accuracy of the current trained neural network is lower than a preset accuracy, or the ratio of the number of the pruned parameters to the total number in the to-be-compressed layer is not lower than the pruning ratio.

Here, the specified ratio is not greater than the pruning ratio. The initial value of the specified ratio may be manually set, or may be set by the electronic device, and the present embodiment does not have any limitations with this respect. Here, if the pruning ratio is 70%, the initial value of the specified ratio may be, for example, 40%, 20%, or 10%. It should be noted that the preset accuracy may be the original accuracy of the neural network or a value slightly lower than the original accuracy. The preset accuracy may be manually set, or may be set by the electronic device based on a preset algorithm. The preset accuracy may be adjusted according to actual needs, and the present embodiment does not have any limitations with this respect.

Then in response to determining that the accuracy of the current trained neural network is not lower than the preset accuracy and the ratio is not lower than the pruning ratio, the electronic device may reset the specified ratio based on the pruning ratio and the ratio, and continue the pruning training operations. For example, the electronic device may subtract the ratio from the pruning ratio to obtain a first ratio, and reset the specified ratio to a positive number not greater than the first ratio. For example, assuming that the pruning ratio is 70% and the ratio is 10%, then the first ratio may be 60%, and the electronic device may select a value in the interval (0, 60%] and reset the specified ratio to this value.

In some alternative implementations of the present embodiment, the electronic device may also reset the specified ratio to a positive number not greater than the first ratio and a current value of the specified ratio. For example, if the current value of the specified ratio is 10% and the first ratio is 60%, the electronic device may select a value (for example, 10%) in the interval (0, 60%] and reset the specified ratio to this value.

In some alternative implementations of the present embodiment, the electronic device may also reset the specified ratio to a positive number less than the current value of the specified ratio and not greater than the first ratio. For example, if the current value of the specified ratio is 30% and the first ratio is 40%, the electronic device may select a value (for example, 20) in the interval (0, 30%) and reset the specified ratio to this value.

Step 204, determining the neural network obtained after performing the processing steps on the selected at least one to-be-compressed layer as a compressed neural network, and storing the compressed neural network.

In the present embodiment, the electronic device may determine the neural network obtained after performing the processing steps on the selected at least one to-be-compressed layer as a compressed neural network, and may store the compressed neural network, for example, storing locally on the electronic device (such as a hard disk or a memory) or on a server in remote communication connection to the electronic device. Here, when storing the compressed neural network, the pruned parameter (that is, the parameter set as the specified value) is generally not required to be stored, and therefore, the storage space may be effectively saved.

Figure 3:
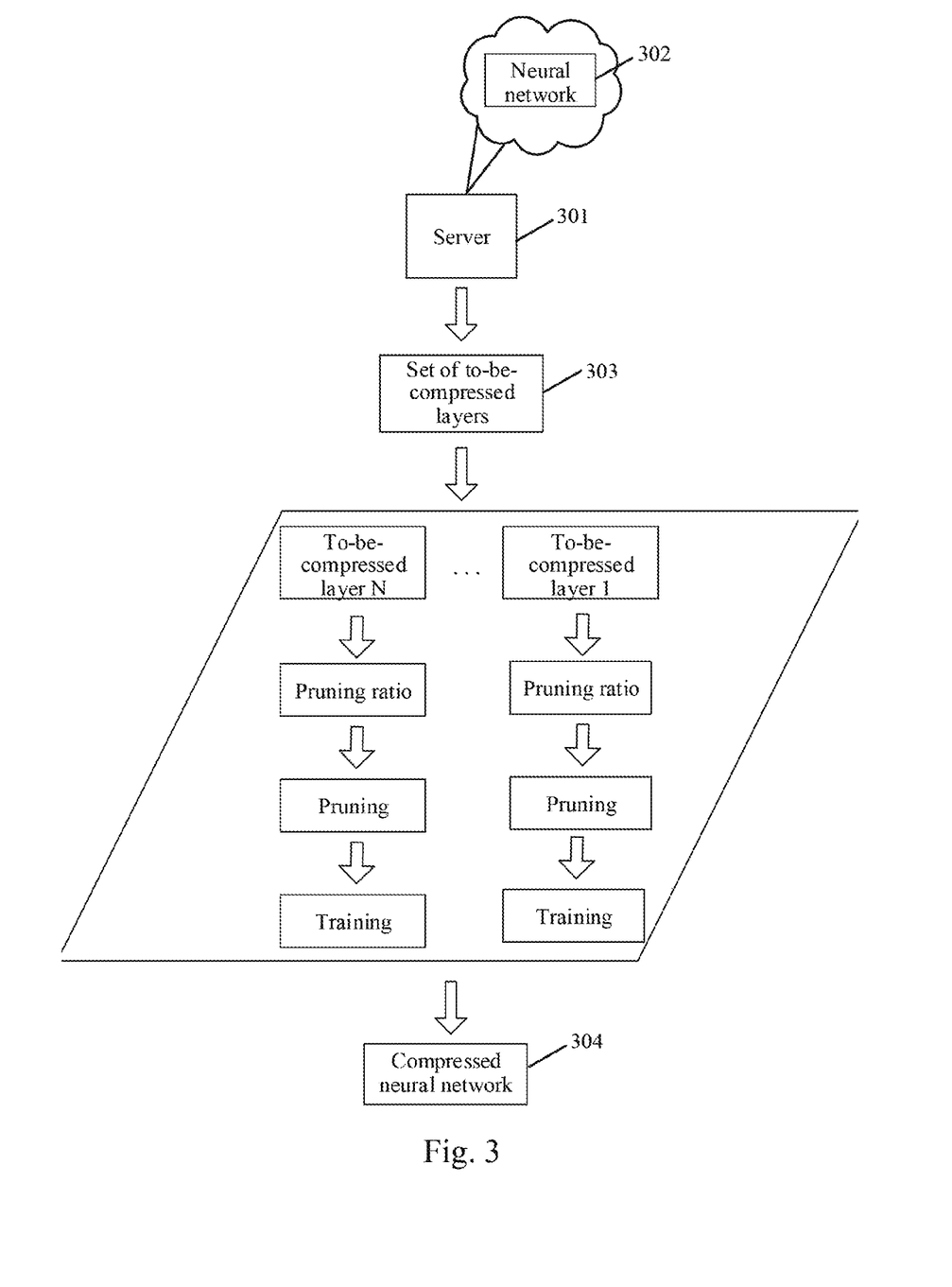
FIG. 3 is a schematic diagram of an application scenario of the method for compressing a neural network according to the present disclosure.

With further reference to FIG. 3, FIG. 3 is a schematic diagram of an application scenario of the method for compressing a neural network according to the present embodiment. In the application scenario of FIG. 3, the parameter value threshold is 0.1. First, the server 301 may locally acquire a to-be-compressed trained neural network 302. Here, the neural network 302 may be a neural network included in a to-be-released application suitable for mobile devices, and the neural network 302 includes N layers, N is a natural number greater than zero. Then, the server 301 may select each layer in the neural network 302 as the to-be-compressed layer, and obtain a set of to-be-compressed layers 303. The set of to-be-compressed layers 303 may include a to-be-compressed layer 1, a to-be-compressed layer 2 . . . a to-be-compressed layer N. Then, the server 301 may perform the following processing steps sequentially on each of the to-be-compressed layers in the set of to-be-compressed layers 303 in descending order of the number of level of the to-be-compressed layer in the neural network 302: determining the pruning ratio based on the total number of parameters included in the to-be-compressed layer, selecting a parameter for pruning from the parameters included in the to-be-compressed layer based on the pruning ratio and the parameter value threshold 0.1, and training the pruned neural network based on a preset training sample using the machine learning method, so that the trained neural network may be restored to the original accuracy as much as possible. Here, the selected parameters are parameters having the absolute value of parameter value not greater than 0.1, and the ratio of the number of selected parameters to the total number is not greater than the pruning ratio. Finally, the server 301 may determine the neural network obtained after performing the processing steps on the selected at least one to-be-compressed layer in the set of to-be-compressed layers 303 as a compressed neural network 304, and store the compressed neural network 304 locally.

The method provided by the embodiments of the present disclosure effectively utilizes the specified processing steps performed on the selected to-be-compressed layer to appropriately prune the parameters in the to-be-compressed layer, and trains the current neural network based on a preset training sample using the machine learning method after the parameters are pruned, so that the neural network may be restored to the original accuracy as much as possible, thereby achieving effective compression of the neural network.

Figure 4:
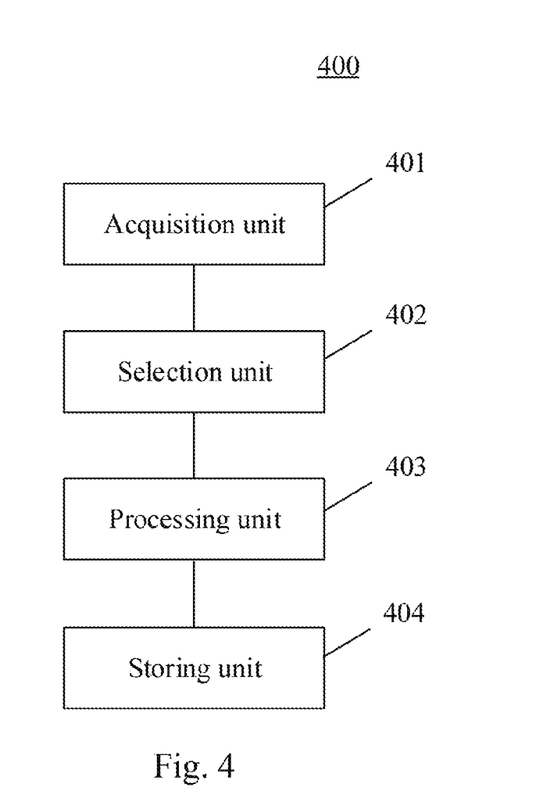
FIG. 4 is a schematic structural diagram of an embodiment of an apparatus for compressing a neural network according to the present disclosure.

With further reference to FIG. 4, as an implementation to the method shown in the above figures, the present disclosure provides an embodiment of an apparatus for compressing a neural network. The apparatus embodiment corresponds to the method embodiment shown in FIG. 2, and the apparatus may specifically be applied to various electronic devices.

As shown in FIG. 4, the apparatus 400 for compressing a neural network of the present embodiment includes: an acquisition unit 401, a selection unit 402, a processing unit 403 and a storing unit 404. Here, the acquisition unit 401 is configured to acquire a to-be-compressed trained neural network. The selection unit 402 is configured to select at least one layer from layers of the neural network as a to-be-compressed layer. The processing unit 403 is configured to perform the following processing steps sequentially on each of the to-be-compressed layers in descending order of the number of level of the to-be-compressed layer in the neural network: determining a pruning ratio based on a total number of parameters included in the to-be-compressed layer, selecting a parameter for pruning from the parameters included in the to-be-compressed layer based on the pruning ratio and a parameter value threshold, and training the pruned neural network based on a preset training sample using a machine learning method. The storing unit 404 is configured to determine the neural network obtained after performing the processing steps on the selected at least one to-be-compressed layer as a compressed neural network, and store the compressed neural network.

In the present embodiment, in the apparatus 400 for compressing a neural network: the specific processing and the technical effects thereof of the acquisition unit 401, the selection unit 402, the processing unit 403, and the storing unit 404 may be referred to the related descriptions of step 201, step 202, step 203, and step 204 in the corresponding embodiment of FIG. 2, respectively, and detailed description thereof will be omitted.

In some alternative implementations of the present embodiment, the selection unit 402 may include: a selection subunit (not shown in the figure), configured to select, in response to the neural network including a convolutional layer and a fully connected layers, at least one of at least one convolutional layer or at least one fully connected layers as the to-be-compressed layer.

In some alternative implementations of the present embodiment, the processing unit 403 may include: a first processing subunit (not shown in the figure), configured to perform the following pruning training operations: determining a product of a specified ratio and the total number as a pruning number, and selecting, from the parameters included in the to-be-compressed layer, the pruning number of parameters having an absolute value of a parameter value not greater than the parameter value threshold for pruning in ascending order of the absolute value of the parameter value, wherein the specified ratio is not greater than the pruning ratio; training the pruned neural network based on the training sample using the machine learning method; and stopping execution of the pruning training operations in response to determining that an accuracy of the current trained neural network is lower than a preset accuracy, or the ratio of the number of the pruned parameters to the total number in the to-be-compressed layer is not lower than the pruning ratio; and a second processing subunit (not shown in the figure), configured to reset the specified ratio based on the pruning ratio and the ratio, and continue the pruning training operations in response to determining that the accuracy of the current trained neural network is not lower than the preset accuracy and the ratio is lower than the pruning ratio.

In some alternative implementations of the present embodiment, the second processing subunit may include: a setting module (not shown in the figure), configured to subtract the ratio from the pruning ratio to obtain a first ratio, and reset the specified ratio to a positive number not greater than the first ratio.

In some alternative implementations of the present embodiment, the setting module may include: a setting submodule not shown in the figure), configured to reset the specified ratio to a positive number not greater than the first ratio and a current value of the specified ratio.

In some alternative implementations of the present embodiment, the setting submodule may be further configured to: reset the specified ratio to a positive number less than the current value of the specified ratio and not greater than the first ratio.

The apparatus provided by the embodiments of the present disclosure effectively utilizes the specified processing steps performed on the selected to-be-compressed layer to appropriately prune the parameters in the to-be-compressed layer, and trains the current neural network based on a preset training sample using the machine learning method after the parameters are pruned, so that the neural network may be restored to the original accuracy as much as possible, thereby achieving effective compression of the neural network.

Figure 5:
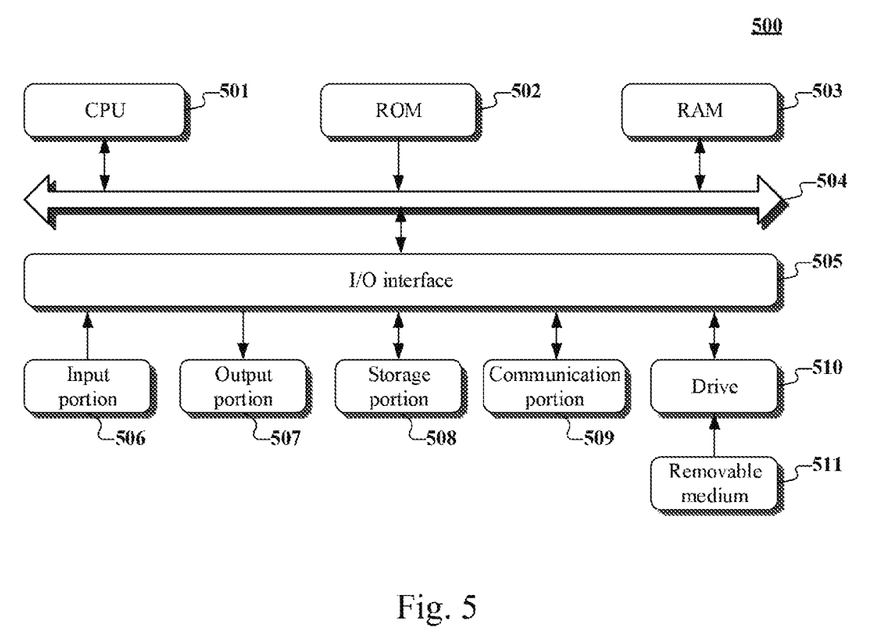
FIG. 5 is a schematic structural diagram of a computer system adapted to implement an electronic device of the embodiments of the present disclosure.

Referring to FIG. 5, a schematic structural diagram of a computer system 500 adapted to implement an electronic device of the embodiments of the present application is shown. The electronic device shown in FIG. 5 is merely an example and should not impose any restriction on the function and scope of use of the embodiments of the present application.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising a cathode ray tube (CRT), a liquid crystal display device (LCD), a speaker etc.; a storage portion 508 including a hard disk and the like; and a communication portion 509 comprising a network interface card, such as a LAN card and a modem. The communication portion 509 performs communication processes via a network, such as the Internet. A drive 510 is also connected to the I/O interface 505 as required. A removable medium 511, such as a magnetic disk, an optical disk, a magneto-optical disk, and a semiconductor memory, may be installed on the drive 510, to facilitate the retrieval of a computer program from the removable medium 511, and the installation thereof on the storage portion 508 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 509, and/or may be installed from the removable media 511. The computer program, when executed by the central processing unit (CPU) 501, implements the above mentioned functionalities as defined by the methods of the present disclosure.

It should be noted that the computer readable medium in the present disclosure may be computer readable storage medium. An example of the computer readable storage medium may include, but not limited to: semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. The computer readable medium may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present application may be implemented by means of software or hardware. The described units or modules may also be provided in a processor, for example, described as: a processor, comprising an acquisition unit, a selection unit, a processing unit, and a storing unit, where the names of these units or modules do not in some cases constitute a limitation to such units or modules themselves. For example, the acquisition unit may also be described as "a unit for acquiring a to-be-compressed trained neural network."

In another aspect, the present application further provides a non-transitory computer-readable storage medium. The non-transitory computer-readable storage medium may be the non-transitory computer-readable storage medium included in the apparatus in the above described embodiments, or a stand-alone non-transitory computer-readable storage medium not assembled into the apparatus. The non-transitory computer-readable storage medium stores one or more programs. The one or more programs, when executed by a device, cause the device to: acquire a to-be-compressed trained neural network; select at least, one layer from layers of the neural network as a to-be-compressed layer; perform following processing steps sequentially on each of the to-be-compressed layers in descending order of a number of level of the to-be-compressed layer in the neural network: determining a pruning ratio based on a total number of parameters included in the to-be-compressed layer, selecting a parameter for pruning from the parameters included in the to-be-compressed layer based on the pruning ratio and a parameter value threshold, and training the pruned neural network based on a preset training sample using a machine learning method; and determine the neural network obtained after performing the processing steps on the selected at least one to-be-compressed layer as a compressed neural network, and store the compressed neural network.

The above description only provides an explanation of the preferred embodiments of the present application and the technical principles used. It should be appreciated by those skilled in the art that the inventive scope of the present application is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present application are examples.

What is claimed is:

1. A method for compressing a neural network, the method comprising:

acquiring a to-be-compressed trained neural network;

selecting at least one layer from layers of the neural network as a to-be-compressed layer;

performing following processing steps sequentially on each of the to-be-compressed layers in descending order of a number of level of the to-be-compressed layer in the neural network: determining a pruning ratio based on a total number of parameters included in the to-be-compressed layer, selecting a parameter for pruning from the parameters included in the to-be-compressed layer based on the pruning ratio and a parameter value threshold, and training the pruned neural network based on a preset training sample using a machine learning method; and determining the neural network obtained after performing the processing steps on the selected at least one to-be-compressed layer as a compressed neural network, and storing the compressed neural network;

wherein selecting a parameter for pruning from the parameters included in the to-be-compressed layer based on the pruning ratio and a parameter value threshold, and training the pruned neural network based on a preset training sample using a machine learning method comprises:

performing following pruning training operations: determining a product of a specified ratio and the total number as a pruning number, and selecting, from the parameters included in the to-be-compressed layer, the pruning number of parameters having an absolute value of a parameter value not greater than the parameter value threshold for pruning in ascending order of the absolute value of the parameter value, wherein the specified ratio is not greater than the pruning ratio; training the pruned neural network based on the training sample using the machine learning method; and subtracting the ratio from the pruning ratio to obtain a first ratio, resetting the specified ratio to a positive number not greater than the first ratio, and continuing the pruning training operations in response to determining that the accuracy of the current trained neural network is not lower than the preset accuracy and the ratio is lower than the pruning ratio.

2. The method according to claim 1, wherein the selecting at least one layer from layers of the neural network as a to-be-compressed layer comprises:
selecting, in response to the neural network comprising a convolutional layer and a fully connected layers, at least one of at least one convolutional layer or at least one fully connected layers as the to-be-compressed layer.

3. The method according to claim 1, wherein the selecting a parameter for pruning from the parameters included in the to-be-compressed layer based on the pruning ratio and a parameter value threshold, and training the pruned neural network based on a preset training sample using a machine learning method further comprises:
stopping execution of the pruning training operations in response to determining that an accuracy of the current trained neural network is lower than a preset accuracy, or a ratio of a number of the pruned parameters to the total number in the to-be-compressed layer is not lower than the pruning ratio.

4. The method according to claim 1, wherein the resetting the specified ratio to a positive number not greater than the first ratio comprises:
resetting the specified ratio to a positive number not greater than the first ratio and a current value of the specified ratio.

5. The method according to claim 4, wherein the resetting the specified ratio to a positive number not greater than the first ratio and a current value of the specified ratio comprises:
resetting the specified ratio to a positive number less than the current value and not greater than the first ratio.

6. An apparatus for compressing a neural network, the apparatus comprising:
at least one processor; and
a memory storing instructions, the instructions when executed by the at least one processor, cause the at least one processor to perform operations, the operations comprising:
acquiring a to-be-compressed trained neural network;
selecting at least one layer from layers of the neural network as a to-be-compressed layer;
performing following processing steps sequentially on each of the to-be-compressed layers in descending order of a number of level of the to-be-compressed layer in the neural network: determining a pruning ratio based on a total number of parameters included in the to-be-compressed layer, selecting a parameter for pruning from the parameters included in the to-be-compressed layer based on the pruning ratio and a parameter value threshold, and training the pruned neural network based on a preset training sample using a machine learning method; and
determining the neural network obtained after performing the processing steps on the selected at least one to-be-compressed layer as a compressed neural network, and storing the compressed neural network,
wherein selecting a parameter for pruning from the parameters included in the to-be-compressed layer based on the pruning ratio and a parameter value threshold, and training the pruned neural network based on a preset training sample using a machine learning method comprises:
performing following pruning training operations: determining a product of a specified ratio and the total number as a pruning number, and selecting, from the parameters included in the to-be-compressed layer, the pruning number of parameters having an absolute value of a parameter value not greater than the parameter value threshold for pruning in ascending order of the absolute value of the parameter value, wherein the specified ratio is not greater than the pruning ratio; training the pruned neural network based on the training sample using the machine learning method; and
subtracting the ratio from the pruning ratio to obtain a first ratio, resetting the specified ratio to a positive number not greater than the first ratio, and continuing the pruning training operations in response to determining that the accuracy of the current trained neural network is not lower than the preset accuracy and the ratio is lower than the pruning ratio.

7. The apparatus according to claim 6, wherein the selecting at least one layer from layers of the neural network as a to-be-compressed layer comprises:
selecting, in response to the neural network comprising a convolutional layer and a fully connected layers, at least one of at least one convolutional layer or at least one fully connected layers as the to-be-compressed layer.

8. The apparatus according to claim 6, wherein the selecting a parameter for pruning from the parameters included in the to-be-compressed layer based on the pruning ratio and a parameter value threshold, and training the pruned neural network based on a preset training sample using a machine learning method further comprises:
stopping execution of the pruning training operations in response to determining that an accuracy of the current trained neural network is lower than a preset accuracy, or a ratio of a number of the pruned parameters to the total number in the to-be-compressed layer is not lower than the pruning ratio.

9. The apparatus according to claim 6, wherein the resetting the specified ratio to a positive number not greater than the first ratio comprises:
resetting the specified ratio to a positive number not greater than the first ratio and a current value of the specified ratio.

10. The apparatus according to claim 9, wherein the resetting the specified ratio to a positive number not greater than the first ratio and a current value of the specified ratio comprises:
resetting the specified ratio to a positive number less than the current value and not greater than the first ratio.

11. A non-transitory computer-readable storage medium storing a computer program, the computer program when executed by one or more processors, causes the one or more processors to perform operations, the operations comprising:
acquiring a to-be-compressed trained neural network;
selecting at least one layer from layers of the neural network as a to-be-compressed layer;
performing following processing steps sequentially on each of the to-be-compressed layers in descending order of a number of level of the to-be-compressed layer in the neural network: determining a pruning ratio based on a total number of parameters included in the to-be-compressed layer, selecting a parameter for pruning from the parameters included in the to-be-compressed layer based on the pruning ratio and a parameter value threshold, and training the pruned neural network based on a preset training sample using a machine learning method; and determining the neural network obtained after performing the processing steps on the selected at least one to-be-compressed layer as a compressed neural network, and storing the compressed neural network, wherein selecting a parameter for pruning from the parameters included in the to-be-compressed layer based on the pruning ratio and a parameter value threshold, and training the pruned neural network based on a preset training sample using a machine learning method comprises:

performing following pruning training operations: determining a product of a specified ratio and the total number as a pruning number, and selecting, from the parameters included in the to-be-compressed layer, the pruning number of parameters having an absolute value of a parameter value not greater than the parameter value threshold for pruning in ascending order of the absolute value of the parameter value, wherein the specified ratio is not greater than the pruning ratio;

training the pruned neural network based on the training sample using the machine learning method; and subtracting the ratio from the pruning ratio to obtain a first ratio, resetting the specified ratio to a positive number not greater than the first ratio, and continuing the pruning training operations in response to determining that the accuracy of the current trained neural network is not lower than the preset accuracy and the ratio is lower than the pruning ratio.

* * * * *